United States Patent Office 2,882,685
Patented Apr. 21, 1959

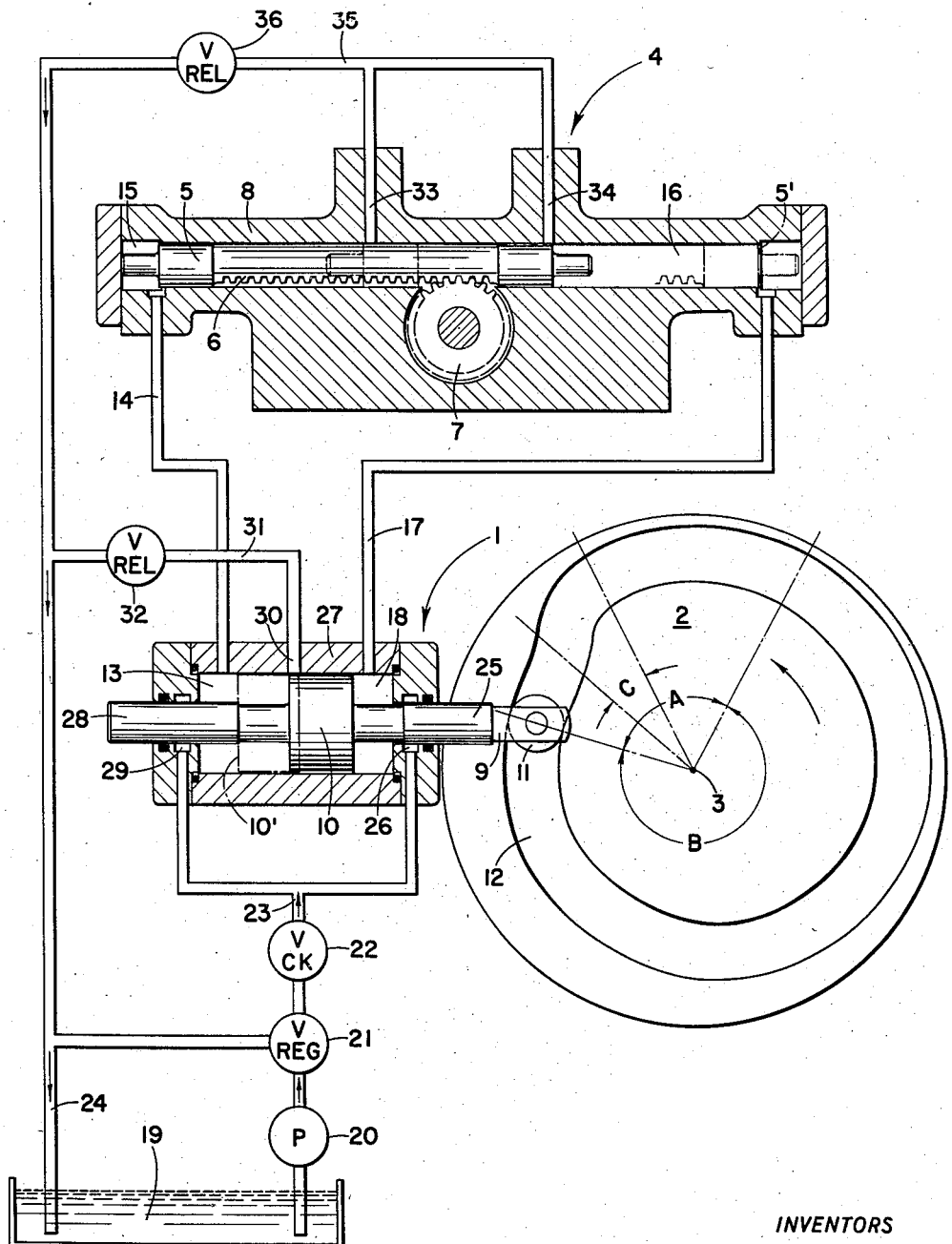

2,882,685

HYDRAULIC MOTION TRANSMITTING SYSTEM

Leonard O. Carlsen, Rochester, Adolph H. Krastel, Irondequoit, and Edward Quincey, Pittsford, N.Y., assignors to The Gleason Works, Rochester, N.Y., a corporation of New York Application July 2, 1956, Serial No. 595,255

17 Claims. (Cl. 60—54.5)

The present invention relates to a hydraulic motion-transmitting system of the kind in which a reciprocating pump delivers fluid under pressure to a reciprocating motor for operating the latter in time therewith.

One objective of the invention is a system of this kind which will be closed between the pump and motor, to assure positive motion transmission, during the working portion of the stroke of the motor, but which will be open at the end of the stroke to avoid shock to the pump drive and to provide for circulation of fluid to scavenge the system of air. Another objective is a system which, upon replacement of its hydraulic connections, will not require any prefilling but which when subsequently operated will automatically refill with hydraulic fluid and reestablish the intended phase relationship between the pump and the motor.

A system according to the invention comprises a fluid pump and a fluid motor both of the reciprocating type, a fluid passage providing continuous fluid communication between the pump chamber and the motor chamber, an auxiliary source of fluid under pressure comprising a sump and a pump device receiving fluid from the sump, a first valve means operating in time with the pump piston for admitting fluid from said source to the pump chamber at the end of the stroke of the piston in which the chamber is contracted, and a second valve means operating in time with the motor piston for exhausting fluid from the motor chamber to the sump at the end of the stroke of the piston in which the chamber is expanded.

In the preferred embodiment of the invention the pump and the motor are both double-acting and the fluid passages and the valve means are duplicated for the two sets of chambers that are disposed on opposite sides of the pump and motor pistons, so that the operation is substantially the same for both the forward and return strokes of the pistons. This embodiment also has an exhaust valve means operating in time with the pump piston for exhausting fluid, at the end of each stroke of the pump piston, from whichever one of the pump chambers has been expanded by such stroke; and two relief valves, the first for restricting the exhaust through said exhaust valve means of the pump and the second for restricting the exhaust through the valve means of the motor. Preferably the first relief valve is set to impose a lesser restriction than the second relief valve, so as to provide a pressure differential which will cause the motor piston to complete its stroke in each direction.

The foregoing and other objects and advantages will appear from the following description made with reference to the accompanying schematic diagram which shows a system especially adapted to operate a machine tool indexing mechanism of the kind disclosed in patent application Serial No. 595,254, filed on even date herewith.

This system comprises a double-acting reciprocating pump 1 operated by a cam 2 that is rotatable about axis 3 and a double-acting reciprocating motor 4. The piston 5 of the motor has rack teeth 6 which mesh with the teeth of a pinion 7 whose shaft is journaled for rotation in the motor cylinder block 8. The rod 9 of the pump piston 10 has a follower pin or roller 11 engaging in the track or groove 12 of cam 2, so that as the cam rotates the piston is reciprocated. As it moves to the left, contracting pump chamber 13, hydraulic fluid is displaced from the chamber and through a conduit 14 into left chamber 15 of the motor, thereby expanding the latter and moving the motor piston 5 to the right. This turns the pinion 7 clockwise, actuating whatever mechanism it may be arranged to operate, such, for example as the index mechanism of the afore-mentioned patent application. Fluid ahead of the motor piston 5, i.e. fluid in right motor chamber 16, exhausts into a conduit 17 which communicates with the right pump chamber 18. After the stroke of the pump piston 10 to the left is completed, a continued rotation of the cam 2 causes the pump piston to be moved to the right, thus displacing fluid from pump chamber 18 into motor chamber 16, and from motor chamber 15 to pump chamber 13, thereby moving the motor piston 5 to the left. This of course turns the pinion 7 counterclockwise and effects return motion of the mechanism driven by the pinion. In practice the conduits 14 and 17, or parts of them, may comprise flexible tubing, to permit of relative motion between the machine parts which support the pump and the motor.

The system includes an auxiliary source of fluid under pressure comprising a sump 19, a pump 20 which preferably is of a type providing a relative constant pressure and continuous delivery, and a suitable drive means (not shown) for the pump. This pump discharges through a pressure regulating valve 21 and check valve 22 into a conduit 23 which communicates, through inlet valve means, with the pump chambers 13 and 18. The valve 21, which may be a pressure relief valve set to maintain the desired system pressure, returns excess fluid from auxiliary pump 20 to the sump 19 through a conduit 24. The inlet valve means comprise piston-controlled ports and operate in time with the piston 10 for admitting fluid from conduit 23 to the pump chambers 13, 18 at the ends of the strokes of the piston in which the respective chambers are contracted. That is, at the end of the stroke of piston 10 to the right, which contracts chamber 18, part 25 of the piston uncovers a port 26 in the right head of pump cylinder block 27 to open conduit 23 to the chamber 18. Similarly at the end of the stroke of the piston to the left, which contracts chamber 13, part 28 of the piston uncovers a port 29 in the left cylinder head to admit fluid from conduit 23 into the chamber 13.

The pump 1 also has an exhaust valve means operating in time with the piston 10 for exhausting fluid at the end of each stroke of the piston from whichever one of chambers 13 and 18 has been expanded by such stroke. This valve means comprises a port 30 in the block 27 which is uncovered by the piston to open chamber 13 to an exhaust conduit 31 when the piston reaches the end of its stroke to the right, and is uncovered to open chamber 18 to the exhaust conduit at the end of the piston stroke to the left. Conduit 31 discharges through a pressure relief valve 32 and thence the conduit 24 into the sump 19.

The motor 4 has an exhaust valve means operating in time with its piston 5 for exhausting fluid from chambers 15 and 16 at the ends of the strokes of the piston in which the respective chambers are expanded. This valve means comprises ports 33 and 34 in cylinder block 8 which are uncovered by piston 5 at the ends of its strokes to the right and to the left, respectively, to exhaust fluid from chambers 15 and 16 into a conduit 35. This conduit discharges through a pressure relief valve 36 and thence the conduit 24 into the sump 19. At least a part of the conduit 24 extending to the motor 4 may comprise flexible tubing to permit of relative motion between the pump 1 and the motor.

In operation, commencing from the position shown in the diagram, as the piston 10 is moved to the left by cam 2, turning counterclockwise through angle A, some small amount of fluid may at first be displaced through port 30 if the load on the pinion 7 is high in relation to the relief pressure for which valve 32 is set. However, as soon as port 30 is closed by piston 10, all of the fluid displaced from chamber 13 is forced through the conduit 14 thereby positively displacing the piston 5 at a rate that is exactly proportionate to that of piston 10 and that is determined by the shape of cam track 12 and the velocity of the cam. The piston displacement of pump 1 is so related to that of motor 4 that when piston 10 has reached its limit position to the left, wherein it is shown by broken lines 10', the piston 5 will have moved through somewhat less than its full stroke to the position in which it is shown by broken lines at 5' in which the port 33 is still covered. At this time the port 29 is uncovered by part 28 of piston 10 so that fluid from the auxiliary pump flows through chamber 13 and conduit 14 into chamber 15, moving the motor piston 5 to the end of its stroke in which it abuts the right cylinder head. Fluid displaced from motor chamber 16 exhausts through conduit 17, pump chamber 18, now uncovered port 30, conduit 31, relief valve 32 and conduit 24 to sump 19. As the piston 5 reaches the end of its stroke the port 33 is uncovered, and allows a continuing flow of fluid from pump 20 through chamber 13 and motor chamber 15 which serves to completely scavenge them of air. Preferably the valve 36 is set to open at a higher pressure than valve 32 so that the piston 5 will stop in abutment with the cylinder head, and the valve 32 at a pressure high enough in relation to the system pressure determined by regulating valve 21 so that the piston 5 will not pound against the cylinder head. In the machine indexing arrangement referred to hereinbefore, the system operates satisfactorily with the valve 21 set to provide a pressure in conduit 23 of about three hundred pounds per square inch and the valves 32 and 36 to open respectively at about two hundred and two hundred and fifty pounds per square inch. At these pressures and with the limited opening provided by port 33 the valve 36 functions much as a bleed valve, allowing only a relatively slow flow of fluid.

As will be apparent from the symmetrical arrangement of both the pump 1 and the motor 4, the operation of the system through the return portion of their cycle, i.e. when piston 10 is moved to the right by cam 2 turning counterclockwise through angle B, is of the same character but of opposite direction to that described in the preceding paragraph. The particular cam 2 that is illustrated is designed to effect one stroke of the piston, namely the stroke to the left, in about forty percent of the time consumed by the return stroke. Moreover the major portion of the stroke to the left is accomplished while the cam turns through the relatively small angle C, and it is during this time that the actual indexing of the machine occurs.

It will be seen that since the piston 5 always completes a full stroke due to the admission to the motor of fluid from the auxiliary source 19, 20, any slight leakage from the system which may occur is made up at the end of every stroke thus assuring a completely filled system between the pressure side of piston 10 and the pressure side of piston 5 during every stroke. The system pressure determined by regulating valve 21 preferably is great enough to actuate whatever mechanism is connected to pinion 7. With this condition and because of the action of the piston-operated valve means and the bleed action of relief valve 36, it will be seen that upon removal and replacement of any of the conduits, the system will automatically refill itself and restore the phase relationship between the two pistons when the cam 2 is rotated.

In the machine index operating embodiment of the invention referred to above the pump 1, which has a stroke of one and one-quarter inches, has a piston displacement slightly more than one percent less than that of the motor 4, and is so arranged that the ports 26, 29 and 30 are uncovered one thirty-second of an inch before the end of the piston stroke. The motor 4, with a stroke of somewhat over five inches, uncovers port 33 about one-sixteenth of an inch before the end of its stroke, i.e. somewhat after port 26 or 29 has been opened.

Having now described the preferred embodiment of the system and its mode of operation, what is claimed is:

1. A hydraulic motion-transmitting system comprising a fluid pump and a fluid motor both of the reciprocating type, a fluid passage providing continuous fluid communication between the pump chamber and the motor chamber, an auxiliary source of fluid under pressure comprising a sump and a pump device receiving fluid from the sump, a first valve means operating in time with the pump piston for admitting fluid from said source to the pump chamber at the end of the stroke of the piston in which the chamber is contracted, and a second valve means operating in time with the motor piston for exhausting fluid from the motor chamber to the sump at the end of the stroke of the piston in which the chamber is expanded.

2. A system according to claim 1 in which there is a pressure relief valve for resisting exhaust of fluid through said second valve means.

3. A system according to claim 1 in which said second valve means comprises a port which leads from the motor chamber and is uncovered by the motor piston as it approaches the end of its stroke in which the chamber is expanded.

4. A system according to claim 1 in which there is an exhaust valve means operating in time with the pump piston for exhausting fluid from the pump chamber to the sump at the end of the stroke of the piston in which the chamber is expanded.

5. A system according to claim 4 in which the motor has a greater piston displacement than the pump.

6. A system according to claim 4 in which there is a passage for returning said exhaust fluid from the pump chamber to said sump, and there is a pressure relief valve in said passage.

7. A system according to claim 4 in which said exhaust valve means comprises a port which leads from the pump chamber and is uncovered by the pump piston as it approaches the end of its stroke in which the chamber is expanded.

8. A hydraulic motion-transmitting system according to claim 1 in which the pump and the motor are both double-acting, and the fluid passages and the valve means are duplicated for the two sets of chambers disposed on opposite sides of the pump and motor pistons, so that the operation is substantially the same for both the forward and return strokes of the pistons.

9. A hydraulic motion-transmitting system comprising a fluid pump and a fluid motor both of the reciprocating type, a fluid passage connecting the pump chamber with the motor chamber, an auxiliary source of fluid under pressure, a port leading into the pump chamber and uncovered by the pump piston to admit fluid from said source to the pump chamber at the end of the stroke of the piston in which the chamber is contracted, and valve means operating in time with the motor piston for exhausting fluid from the motor chamber at the end of the stroke of the piston in which the chamber is expanded.

10. A hydraulic motion-transmitting system comprising a fluid pump and a fluid motor both of the double-acting reciprocating type, a pair of continuously open fluid passages connecting the two pump chambers respectively to the two motor chambers, an auxiliary source of fluid under pressure comprising a sump and a pumping device receiving fluid from the sump, first valve means operating in time with the pump piston for admitting fluid from said source to the pump chambers at the ends of the strokes of the piston in which the respective chambers are contracted, and second valve means operating in time with the motor piston for exhausting fluid from the motor chambers to the sump at the ends of the strokes of the piston in which the respective chambers are expanded.

11. A system according to claim 10 in which said second valve means comprises a pair of ports which lead respectively from the motor chambers, each port being so disposed as to be uncovered by the motor piston as it approaches the end of its stroke in which the chamber related to the port is expanded.

12. A system according to claim 10 in which there is an exhaust valve means operating in time with the pump piston for exhausting fluid to the sump at the end of each stroke of the piston, from whichever one of the pump chambers has been expanded by such stroke.

13. A system according to claim 12 in which the motor has a greater piston displacement than the pump.

14. A system according to claim 12 in which said exhaust valve means comprises a single port uncovered by the pump piston as it approaches the end of each stroke.

15. A system according to claim 12 in which there is a first relief valve for restricting the exhaust through said second valve means, and a second relief valve for restricting exhaust through said valve means for exhausting fluid from the pump chambers.

16. A system according to claim 15 in which the first relief valve maintains a greater pressure than the second relief valve.

17. A hydraulic motion-transmitting system comprising a fluid pump and a fluid motor both of the double-acting reciprocating type, a pair of fluid passages connecting the two pump chambers respectively to the two motor chambers, an auxiliary source of fluid under pressure, a pair of ports leading respectively into the pump chambers, each port being so disposed as to be uncovered by the pump piston for admitting fluid from said source to the related pump chamber as the piston approaches the end of its stroke in which that chamber is contracted, and valve means operating in time with the motor piston for exhausting fluid from the motor chambers at the ends of the strokes of the piston in which the respective chambers are expanded.

References Cited in the file of this patent

UNITED STATES PATENTS

| | | |
|---|---|---|
| 1,954,534 | Norton | Apr. 10, 1934 |
| 2,359,949 | Van Der Werff | Oct. 10, 1944 |
| 2,437,821 | Hughes | Mar. 16, 1948 |